UNITED STATES PATENT OFFICE.

REGINALD A. FESSENDEN, OF BRANT ROCK, MASSACHUSETTS, ASSIGNOR TO NATIONAL ELECTRIC SIGNALING COMPANY, OF PITTSBURGH, PENNSYLVANIA, A CORPORATION OF NEW JERSEY.

HIGH-FREQUENCY ELECTRICAL CONDUCTOR.

1,039,717.

Specification of Letters Patent. Patented Oct. 1, 1912.

Application filed January 7, 1911. Serial No. 601,380.

*To all whom it may concern:*

Be it known that I, REGINALD A. FESSENDEN, a citizen of the United States, residing at Brant Rock, in the State of Massachusetts, have invented certain new and useful Improvements in High-Frequency Electrical Conductors, of which the following is a specification.

My invention relates to electrical apparatus for dealing with high frequency currents, more particularly to the construction of conductors such as the coils employed in wireless telegraph apparatus. Its primary object is to produce a more efficient form of coil or other conductor, and especially to construct a coil having a large amount of selfinduction per unit of resistance.

I have illustrated the invention in several forms in the accompanying drawings, wherein—

Figure 1:
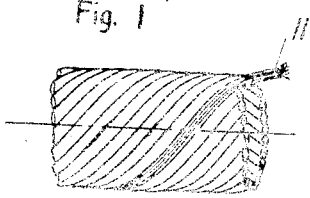
Figure 2:
Figure 3:
Figure 4:
Figure 5:
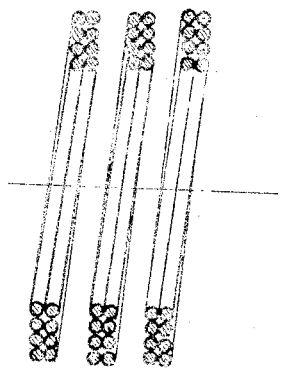

Figure 1 is a side elevation of a portion of a conductor for making coils and Fig. 2 is a cross-section of the same; Fig. 3 is a side elevation of another form of conductor and Fig. 4 is a cross-section of it, while Fig. 5 is a partial longitudinal section of a coil made by winding the conductor edgewise.

In order to produce a large amount of selfinduction per unit of resistance, I make the conductor out of a number of elements grouped together so as to take the general form of a flat strip, i. e., the width of the conductor is greater than its thickness. For instance, in Fig. 2, the width may be one-eighth of an inch while the thickness is one-sixty-fourth, from which it will be seen that I here use small wire. These wires forming the individual elements are preferably coated with insulation such as enamel and the conductor itself should be made in spiral or woven form, so that within a certain length of the conductor every individual elemental wire will successively occupy every position around the circumference of a conductor. Such a conductor is then wound edgewise to form a coil, as indicated in Fig. 5.

In Fig. 1, the conductor is made by assembling the wires in the form of a hollow twisted tube and the tube is then flattened to have a sectional shape as indicated in Fig. 2. In Fig. 3, I show a form in which the wires are first braided in tubular form after the fashion of a tubular lamp wick and the braided tube is then flattened in the form of Fig. 4.

Of course the strip or conductor may be more than two wires thick and may have any number of layers of wire; and moreover each of the wires described may itself consist of a number of smaller wires laid together with a circular twist as indicated at 11, in Figs. 1 and 2. In such case these ultimate subdivisions are themselves preferably insulated as by enamel, and this latter construction I have found especially adapted in making large conductors, such as a conductor ¼″ thick and two inches wide. Such a conductor may be made by first constructing the composite wire say of 500 elements insulated and laid together with a circular twist and then this conductor put together as indicated in the drawings. I find such construction gives better results than making the flat conductors out of a great number of layers.

By thus forming a large number of wires in the shape of a flat strip or conductor and then winding such flat conductor edgewise into a coil, I obtain a much larger inductance for a given resistance than has been made with any other form of conductor, and I thereby obtain higher efficiency in apparatus for generating and utilizing high frequency currents. This advantage is especially marked in dealing with electrical oscillations in wireless telegraphy.

Having thus described my invention and illustrated its use, what I claim is the following:

1. A coil for high frequency currents formed of a strip conductor wound edgewise, said strip conductor being formed of a number of wires and the position of said wires in the strip being varied with the length of the strip.

2. A coil for high frequency currents formed of a strip conductor wound edgewise, said strip conductor being formed of a number of wires and the position of said wires in the strip being uniformly varied with the length of the strip.

3. A coil for high frequency currents formed of a strip conductor wound edgewise, said strip conductor being formed of a number of wires and the position of said wires in the strip being varied in spiral fashion with the length of the strip.

4. A coil for high frequency currents formed of a strip conductor wound edgewise, said strip conductor being formed of a number of wires and the position of said wires in the strip being varied in spiral fashion and in opposite senses with the length of the strip.

5. A coil for high frequency currents formed of a strip conductor wound edgewise, said strip conductor being formed of a number of wires and the position of said wires in the strip being varied in spiral fashion and in opposite senses, with the length of the strip, and plaited.

6. A coil for high frequency currents formed of a strip conductor wound edgewise, said strip conductor being formed of a number of main wires, each of said main wires being formed of a number of smaller or sub-wires, the position of said main wires in the strip being varied with the length of the strip and the position of said sub-wires in said main wire being varied with the length of the main wire.

7. A coil for high frequency currents formed of a strip conductor wound edgewise, said strip conductor being formed of a number of main wires, each of said main wires being formed of a number of smaller or sub-wires, the position of said main wires in the strip being uniformly varied with the length of the strip and the position of said sub-wires in said main wire being uniformly varied with the length of the main wire.

In testimony whereof I have hereunto signed my name in the presence of the two subscribed witnesses.

REGINALD A. FESSENDEN.

Witnesses:
JESSIE E. BENT,
FLORENCE M. LYON.